United States Patent [19]

Noomen

[11] 4,382,102
[45] May 3, 1983

[54] U.V.-CURABLE COATING COMPOSITION

[75] Inventor: Arie Noomen, Voorhout, Netherlands

[73] Assignee: Akzo nv, Arnhem, Netherlands

[21] Appl. No.: 308,167

[22] Filed: Oct. 2, 1981

[30] Foreign Application Priority Data

Oct. 7, 1980 [NL] Netherlands .......................... 8005533

[51] Int. Cl.$^3$ ............................................. B05D 3/06
[52] U.S. Cl. .............................. 427/54.1; 204/159.19; 204/159.23
[58] Field of Search ................................. 427/44, 54.1; 204/159.23, 159.24

[56] References Cited

U.S. PATENT DOCUMENTS

| | | | |
|---|---|---|---|
| 3,699,026 | 10/1972 | Jenkins et al. ................. | 204/159.23 |
| 3,759,807 | 9/1973 | Osborn et al. ................. | 204/159.23 |
| 3,857,769 | 12/1974 | McGinniss ..................... | 204/159.24 |
| 3,962,055 | 6/1976 | Pacifici ........................... | 204/159.24 |
| 3,962,056 | 6/1976 | Pacifici ........................... | 204/159.24 |
| 3,970,535 | 7/1976 | McGinniss ..................... | 204/159.24 |
| 3,974,053 | 8/1976 | Nemcek et al. ................ | 204/159.24 |
| 4,189,366 | 2/1980 | Newland et al. ............... | 204/159.24 |
| 4,207,156 | 6/1980 | Collins et al. .................. | 204/159.24 |

*Primary Examiner*—John H. Newsome
*Attorney, Agent, or Firm*—Stevens, Davis, Miller & Mosher

[57] ABSTRACT

A coating composition curable under the influence of ultraviolet light is disclosed comprising a U.V.-curable binder, a photoinitiator, and a nitrogen-containing accelerator, and characterized in that the accelerator is an N,N'-disubstituted cyclic 1,3-diaza compound having 5 to 9 ring atoms.

10 Claims, No Drawings

U.V.-CURABLE COATING COMPOSITION

This invention relates to a coating composition which may be cured under the influence of ultraviolet light and is based on a U.V.-curable binder, a photoinitiator, and a nitrogen-containing accelerator.

The photoinitiator used in known compositions is generally an aromatic carbonyl compound and the accelerator an alkanolamine. This combination leads to a good surface hardness of cured coatings of pigmented or non-pigmented compositions. A drawback, however, is that the alkanolamines are generally insufficiently compatible with U.V.-curable binders, so that hazing takes place in the coating of the cured composition or exudation of the accelerator as a result of migration of these accelerators. Another drawback consists in that when use is made of alkanolamines, it is not possible to choose just any U.V.-curable binder; no use can be made for instance of a binder having free isocyanate groups and/or epoxy groups, because the resulting reaction between such groups would cause the compositions obtained to have an inadmissibly short storage life.

The present invention aims at providing a composition which does not show the above-mentioned drawbacks while retaining the advantages of rapid and proper curing.

The composition according to the present invention is characterized in that the accelerator is an N,N'-disubstituted cyclic 1,3-diaza compound having 5 to 9 ring atoms. It is preferred that the accelerators should be N,N'-disubstituted imidazolidine or hexahydropyrimidine compounds.

As a binder, generally any U.V.-curable binder may be chosen. Examples of suitable binders include unsaturated polyester resin and alkyd resins, unsaturated melamine formaldehyde resins, polybutadiene resins, and unsaturated compounds such as (meth)acrylates and allyl compounds.

Examples of U.V.-curable polyesters include polycondensation products from unsaturated di- or polycarboxylic acids or derivatives thereof, for instance: maleic acid, maleic anhydride and/or fumaric acid, and polyols such as ethylene glycol, 1,2-propane diol, diethylene glycol, 1,3-propylene glycol, polyethylene glycol, hexane diol, glycerol, trimethylol propane and/or pentaerythritol. Besides the unsaturated carboxylic acids there may be present saturated carboxylic acids, for instance: synthetic and/or natural fatty acids, benzoic acid, isononanoic acid, malonic acid, glutaric acid, adipic acid, azelaic acid, sebacic acid, tetrahydrophthalic acid, phthalic acid, phthalic anhydride, isophthalic acid, terephthalic acid, hexachloroendomethylene tetrahydrophthalic acid and/or trimellitic acid. Usually these polyesters are mixed with ethylenically unsaturated monomeric compounds, such as methacrylic compounds and vinyl compounds, including acrylate compounds and allyl compounds. As monomeric compounds, as a rule, styrene, vinyl toluene and/or methyl methacrylate are employed.

Illustrative (meth)acrylates and allyl compounds are methyl acrylate, methyl methacrylate, ethyl acrylate, ethyl methacrylate, butyl acrylate; (meth)acrylic esters of aliphatic diols and/or polyols, for instance: ethylene diacrylate, trimethylol propane triacrylate and pentaerythritol tetraacrylate; hydroxy(meth)acrylates such as hydroxyethyl acrylate, 2-hydroxypropyl acrylate, 3-hydroxypropyl methacrylate, 4-hydroxybutyl acrylate and pentaerythritol triacrylate and allyl compounds such as diallyl phthalate, diallyl maleate, triallyl isocyanurate and ethylene glycol diallyl ether. Optionally, these compounds may be mixed with possibly smaller amounts of monomers such as acrylonitrile, methacrylonitrile, acrylamide, methacrylamide, N,N-disubstituted acrylamides and methacrylamides, vinyl acetate, succinic divinyl ester, isobutyl vinyl ether, 1,4-butane diol divinyl ether, styrene, alkyl styrene, halogen styrene, divinyl benzene, vinyl naphthalene and N-vinyl pyrrolidone.

It is preferred, however, that the binder to be used should be an urethane acrylate resin, more particularly at least one isocyanate group-containing adduct of (a) an acrylic or methacrylic hydroxy ester having 5 to 20 carbon atoms and (b) a polyisocyanate having 4 to 44 carbon atoms and 2 to 4 isocyanate groups. As examples of suitable isocyanate compounds may be mentioned hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4-butane diol and 2 molecules of isophoron diisocyanate, the adduct of 1 molecule of 1,4-butane diol and 2 molecules of hexamethylene diisocyanate, dicyclohexyl methane-4,4'-diisocyanate, xylylene diisocyanate, 1,3,5-trimethyl-(2-4-ω-diisocyanatomethyl)-benzene, toluenediisocyanate, diphenylmethane-4,4'-diisocyanate, the adduct of 3 molecules of hexamethylene diisocyanate and 1 molecule of water, the adduct of 1 molecule of trimethylol propane and 3 molecules of isophoron diisocyanate, the adduct of 1 molecule of trimethyolol propane and 3 molecules of toluene diisocyanate, the adduct of 1 molecule of pentaerythritol and 4 molecules of hexamethylene diisocyanate; and isocyanurate derivatives having at least 2 isocyanate groups, for instance cyclic trimers of diisocyanates, such as isophoron diisocyanate and alkylene diisocyanate, for instance hexamethylene diisocyanate. As examples of suitable hydroxy(meth)acrylates containing at least one hydroxy group may be mentioned 2-hydroxyethyl acrylate, 2-hydroxyethyl methacrylate, 2-hydroxypropyl methacrylate, 4-hydroxybutyl acrylate, 12-hydroxydodecanyl acrylate, 2-hydroxy-3-chloropropyl acrylate, trimethylol propane diacrylate, trimethylol propane dimethacrylate, pentaerythritol diacrylate and pentaerythritol triacrylate. Use of the abovementioned urethane acrylate resins offers the advantage that the diaza compounds used according to the invention as accelerators are chemically bonded in the final coating layer, as a result of which an undesirable plasticizing effect is avoided. The use of such a compound has the additional advantage that it results in an increase in the molecular weight of the isocyanate compound, so that the physical properties and the durability of the coating are further improved.

Other binders that are preferably used in the coating composition according to this invention are unsaturated epoxy resins; for instance those that are obtained by complete or partial addition of (meth)acrylic acid or of a half ester of a polyvalent carboxylic acid and a hydroxy acrylate compound to an epoxy compound having 2 or more epoxy groups. As examples of suitable epoxy compounds may be mentioned: 1,4-butane diol diglycidyl ether and the diglycidyl ethers of 4,4'-dihydroxydiphenyl-2,2-propane, 1,1'-isopropylidene-bis-(p-phenyleneoxy)-2-dipropanol, polyglycidyl ethers of phenol formaldehyde novolac and hydantoin epoxy resins. Alternatively, it is also possible to use mixtures of unsaturated polymers in combination, if desired, with saturated polymers, or to employ U.V.-curable mixtures of polymers and saturated or unsaturated monomeric compounds.

Suitable photoinitiators are for example: aromatic carbonyl compounds such as benzil, benzil dimethyl ketal, acetophenone, substituted acetophenones, thioxanthone and chlorothioxanthone. It is preferred that use should be made of benzophenone. Optionally, use may be made of colored compounds such as aromatic azo compounds and compounds such as benzoin and ethers thereof, such as the methyl ether, the ethyl ether, the propyl ether and the tert.butyl ether. Also mixtures of photoinitiators may be used.

The photoinitiator is usualy present in an amount of 0.05 to 10% by weight, based on the U.V.-curable binder.

A representative group of the diaza compounds to be used according to the present invention as accelerator in the photoinitiator system are the compounds of the formula

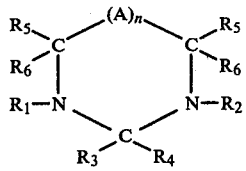

wherein $R_1$ and $R_2$ may be the same or different and represent a hydrocarbon group having 1–12 carbon atoms or a

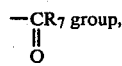

wherein $R_7$ has the meaning of a hydrocarbon group having 1–12 carbon atoms, and $R_3$ and $R_4$ may be the same or different and represent a hydrogen atom or a hydrocarbon group having 1–12 carbon atoms, or together form an alkylene group having 4–6 carbon atoms in the main chain, and A has the meaning of a

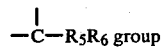

or an oxygen atom positioned between two carbon atoms, and $R_5$ and $R_6$ are the same or different and have the meaning of a hydrogen atom or an alkyl group having 1–4 carbon atoms, and n is an integer from 0 to 4.

The hydrocarbon groups that may be chosen for each of the substituents $R_1$–$R_7$ may carry one or more substituents that are inert to the ethylenically unsaturated groups of the U.V.-curable binder. Examples of inert substituents include cyano groups, halogen groups, hydroxyl groups, nitro groups, acyl groups or aroyl groups, aldehyde groups, ether groups, ester groups, tert.amino groups and N,N-disubstituted amido groups. Non-inert substituents are imino groups, amino groups and thiol groups.

As examples of suitable N,N'-disubstituted imidazolidine or hexahydropyrimidine compounds, where the aforementioned substituents $R_1$–$R_7$ exclusively are hydrogen atoms or unsubstituted hydrocarbon groups, may be mentioned: 2-pentamethylene-N,N'-dimethylimidazolidine-1,3; N,N'-dimethylimidazolidine; N,N'-di-n.butylimidazolidine; N,N'-dicyclohexylimidazolidine; N,N'-di-isopropylimidazolidine; N,N'-bisdodecylimidazolidine; 2-pentamethylene-N,N'-dimethylhexahydropyrimidine; N,N'-dibutylhexahydropyrimidine; N,N'-dibenzylhexahydropyrimidine; N,N'-bisodecylhexahydropyrimidine; 2,2-dimethyl-N,N'-dibutylhexahydropyrimidine; and the corresponding cyclic diaza compounds having 5, 6 or 7 carbon or oxygen atoms in the ring. These compounds may be prepared by, for instance, cyclization of N,N-disubstituted ethylene diamines or propylene diamines with the aid of suitable carbonyl compounds, such as aldehydes or ketones, for instance formaldehyde or cyclohexanone; it is preferred that as carbonyl compound a ketone should be used.

Examples of other suitable diaza compounds include N,N'-diethyl-β-dicarbethoxyimidazolidine-1,3; N,N'-diacetylimidazolidine, N,N'-diethyl-β-dicyanoimidazolidine; 2-pentamethylene-N,N'-diethyl-β-dicyanoimidazolidine, N-β-hydroxyethyl-N'-β-cyanoethylimidazolidine; N,N'-diethyl-β-dicyano-5-methylimidazolidine; N,N'-diacetylhexahydropyrimidine; N,N'-di-β-cyanoethylhexahydropyrimidine; N,N'-di-β-carbethoxyethylhexahydropyrimidine; N,N'-bis(propionic diethylamide)hexahydropyrimidine and the corresponding cyclic diaza compounds having 5, 6 or 7 carbon atoms or oxygen atoms in the ring. The above-envisaged N,N'-diacyl diaza compounds may be prepared as described by Mod, Magne and Sumrell in J. Am. Oil Chem. Soc. 48 (1971), p. 254. Other applicable diaza compounds may be prepared by the addition of a cyclic diaza compound having a secondary N-atom, such as an imidazolidine or hexahydropyrimidine compound having a secondary N-atom, to a suitable α,β-ethylenically unsaturated carbonyl compound such as (meth)acrylic acid derivatives, for instance (meth)acrylonitrile, (meth)acrylamide or a (meth)acrylic ester. An alternative procedure consists in the addition of N-substituted diamines, for instance N-methylene diamine, or N-methyl propylene diamine, to the α,β-ethylenically unsaturated carbonyl compound and cyclization of the resulting reaction product with the aid of a suitable carbonyl compound, for instance formaldehyde or cyclohexanone.

Use also may be made of accelerators having more than one cyclic diaza group. These oligomers are preferably prepared by addition of a suitable N-substituted diamine, for instance N-methylethylene diamine or N-methylpropylene diamine, to a polyacryl compound such as a (meth)acrylic 2- or polyvalent hydroxy compound, for instance butane diol, trimethylol propane or pentaerythritol and cyclization of the reaction product with the aldehyde or ketone desired to that end. It is preferred that use should be made of oligomers having a molecular weight in the range of from about 350 to about 2000.

Another group of suitable accelerators according to this invention are the compounds of the formula:

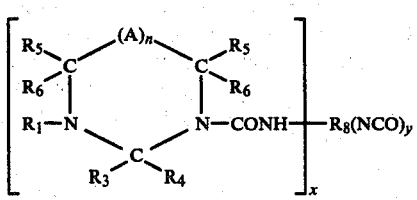

wherein A and the groups $R_1$ and $R_3$–$R_7$ have the same meaning as the corresponding groups in the preceding general formula, n is an integer from 0 to 4, and $R_8$ represents an (x+y)-valent group formed by abstraction of (x+y) isocyanate groups from an (x+y)-valent polyisocyanate, x being an integer from 1 to 4, y an integer from 0 to 3 and (x+y) being equal to 2, 3 or 4.

When use is made of binders that are non-reactive toward the accelerator, the accelerator is generally employed in an amount of about 0.1–10% by weight, based on the binder. In the case of reactive binders, such as those having isocyanate or epoxy groups, the accelerator is usually employed in an amount of 0.7–1.3 equivalents per equivalent of the binder.

Optionally, the coating composition may contain still other additives, for instance: pigment dispersing agents, levelling agents, fillers, pigments, dyes, polymerization inhibitors, and inert or non-inert solvents.

The coating composition may be applied to the desired substrate in any convenient manner, for instance by roller coating, by brush, sprinkling, flow coating, dipping or spraying. The coating composition may be applied to any substrate desired, for instance to a plastics material, chip board or other board, wood, and preferably to metal substrates as coating in an automobile paint system.

As UV-radiation source, a high-, medium- or low-pressure mercury or xenon lamp may for instance serve. The composition need be exposed to radiation generally only for a few seconds up to a few minutes. The radiation applied normally has a wave length of 90–600 nm.

This invention is illustrated in but not limited by the following examples. In them the Persoz hardness of the cured coat was measured and expressed in seconds (ISO-standard 1522). The gloss and the appearance were evaluated visually. Radiation of the composition with UV-light was always carried out with the aid of a high-pressure mercury-vapor lamp (type HOK 80 w/cm, made by Philips), which was always positioned at a distance of 40 cm from the substrate.

EXAMPLE I

Use was made of a mixture of 100 parts by weight of a 60% by weight solution of the adduct of 1 mole of hexamethylene diisocyanate and 2 moles of pentaerythritol triacrylate in hexane diol diacrylate, 2 parts by weight of benzophenone, and 2 parts by weight of the imidazolidine compounds as accelerator formed from 1 mole of ethylene diamine and 2 moles of butane diol diacrylate with cyclization by means of formaldehyde. The resulting composition was applied to a degreased steel panel to a layer thickness of 30 μm (in the cured state).

For comparison the same mixture was prepared in the absence of any accelerator (control) and in the presence of 2 parts by weight of dimethylethanol amine as accelerator (comparative Example A). The mixtures were exposed to radiation for 10 seconds.

The results are shown in Table 1.

TABLE 1

| Example | Hardness | Gloss | Appearance |
|---|---|---|---|
| Example 1 | 135 | excellent | excellent |
| Comparative | | | exudation |
| Example A | 124 | moderate | symptoms |
| Control | 5 | moderate | very tacky |

EXAMPLE II

The same procedure was employed as in Example I, except that use was made of the reaction product of 1 mole of 1,3-propylene diamine and 2 moles of butane diol diacrylate as accelerator cyclized with the aid of formaldehyde.

The cured coat had a hardness of 164 and its gloss and appearance were excellent.

EXAMPLE III

A 70% by weight solution of the reaction product of 1 mole of the adduct of 3 moles of hexamethylene diisocyanate and 1 mole of water with 1½ moles of pentaerythritol triacrylate in butyl acrylate was mixed with an equivalent amount (calculated on free NCO) of the accelerators from Examples I and II and the formaldehyde-cyclized reaction product of 2 moles of 1,3-propylene diamine and 3 moles of hexane diol diacrylate as accelerator (accelerator C).

Moreover, a control experiment was carried out in the absence of an accelerator.

To the mixtures there was added 2% by weight of benzophenone. The compositions thus obtained were applied to degreased steel to a layer thickness of 30 μm (in the cured state) and subjected to radiation for 10 seconds. The cured coat was tack-free.

The hardness was determined immediately after irradiation, after 4 hours, and after 1 day, respectively; it appears to increase with time.

The results are given in Table 2. It follows from these results that the reaction products that were tested are effective accelerators and from the increasing hardness of the coating it is apparent that their reaction with the isocyanate compound is attended with an increase in the molecular weight thereof.

TABLE 2

| | Hardness | | |
|---|---|---|---|
| Accelerator | immediately after irradiation | after 4 hours | after 1 day |
| Accelerator Example I | 71 | 83 | 95 |
| Accelerator Example II | 70 | 91 | 119 |
| Accelerator C | 87 | 106 | 120 |
| Control | 5 | 8 | 45 |

EXAMPLE IV

An epoxy acrylate resin having a free epoxy group was prepared as follows:

A mixture of 380 g of diglycidyl ether of Bisphenol A (marketed by Shell under the trade name Epikote 828) and 72 g of acrylic acid was dissolved in 150 g of toluene. There were added 1.8 g of benzyltrimethyl ammonium methoxide as catalyst and 0.44 g of tert.butyl hydroquinone as inhibitor. The mixture was heated to 80° C., with stirring and passing a stream of nitrogen therethrough. Of the product obtained after 5 hours the acid number had dropped to 5.4.

To 100 g of this binder there was added a stoichiometric amount (calculated on free epoxy groups) of the reaction product of Example I and 2% by weight of benzophenone.

The resulting composition was applied to a degreased steel panel to a thickness of 30 μm (in the cured state) and subsequently passed under a high-pressure UV-lamp at a speed of 3.5 m/minute.

The hardness was determined immediately after irradiation and after 1, 2, 4, and 7 days. The hardness was again found to increase. The values measured were 48, 56, 74, 85 and 106, respectively.

EXAMPLE V

The same procedure was employed as in Example III, except that use was made of 1 mole of pentaerythritol instead of 1½ moles and the reaction product of 1 mole of hexamethylene diisocyanate and 2 moles of N-methylhexahydropyrimidine as accelerator. This accelerator was prepared as follows: A mixture of 100 g of N-methylhexahydropyrimidine and 150 g of ethyl acetate was slowly added to a solution of 84 g of hexamethylene diisocyanate in 100 g of ethyl acetate at a temperature of 25°-35° C. The reaction mixture was subsequently stirred for 8 hours at room temperature and the resulting reaction product (N,N'-(1,6-hexanediyl-bis-(3-methyl-1-hexahydropyrimidine carboxamide)) was isolated by distillation of the solvent.

The cured coat was tack-free and did not show any surface defects. The hardness was determined immediately after irradiation, after 4 hours, and after 1 day. The values found were 65, 79 and 98 seconds, respectively.

What is claimed is:

1. A coating composition curable under the influence of ultraviolet light comprising a U.V-curable binder, a photoinitiator, and a nitrogen-containing accelerator, and characterized in that the accelerator is an N,N'-disubstituted cyclic 1,3-diaza compound having 5 to 9 ring atoms.

2. A coating composition according to claim 1, characterized in that the accelerator is an N,N'-disubstituted imidazolidine or hexahydropyrimidine.

3. A coating composition according to claim 1 or claim 2, characterized in that the accelerator is a compound of the formula

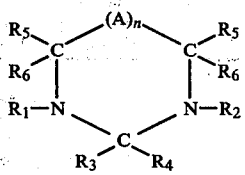

wherein $R_1$ and $R_2$ may be the same or different and represent a hydrocarbon group having 1–12 carbon atoms or a

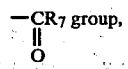

wherein $R_7$ has the meaning of a hydrocarbon group having 1–12 carbon atoms, and $R_3$ and $R_4$ may be the same or different and represent a hydrogen atom or a hydrocarbon group having 1–12 carbon atoms, or together form an alkylene group having 4–6 carbon atoms in the main chain, and A has the meaning of a $-C-R_5R_6$ group or an oxygen atom positioned between two carbon atoms, and $R_5$ and $R_6$ are again the same or different and have the meaning of a hydrogen atom or an alkyl group having 1–4 carbon atoms, and n is an integer from 0 to 4.

4. A coating composition according to claim 3, characterized in that the substituents $R_1$–$R_7$ in the general formula are exclusively hydrogen atoms or unsubstituted hydrocarbon groups, and n is 0 or 1.

5. A coating composition according to claim 1, characterized in that the accelerator is an oligomer having more than one cyclic diaza group.

6. A coating composition according to claim 5, characterized in that the oligomer has a molecular weight in the range of about 350 to about 2000.

7. A coating composition according to claim 1, characterized in that the accelerator is a compound of the formula:

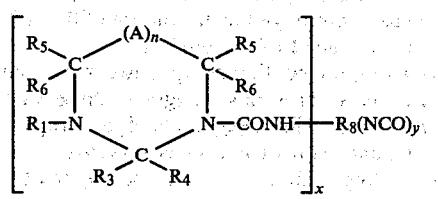

wherein $R_1$ represents a hydrocarbon group having 1–12 carbon atoms or a

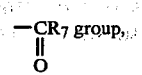

where $R_7$ has the meaning of a hydrocarbon group having 1–12 carbon atoms, $R_3$ and $R_4$ may be the same or different and have the meaning of a hydrogen atom or a hydrocarbon group having 1–12 carbon atoms, or together form an alkylene group having 4–6 carbon atoms in the main chain, and A has the meaning of a $-CR_5R_6$ group or an oxygen atom positioned between 2 carbon atoms and $R_5$ and $R_6$, which may again be the same or different, have the meaning of a hydrogen atom or an alkyl group having 1–4 carbon atoms, and n is an integer from 0 to 4, and wherein $R_8$ represents an (x+y)-valent group formed by abstraction of (x+y) isocyanate groups from an (x+y)-valent polyisocyanate, x being an integer from 1 to 4 and y being an integer from 0 to 3 and (x+y) being equal to 2, 3 or 4.

8. A coating composition according to claim 1, characterized in that the UV-curable binder is an at least one isocyanate group-containing adduct of
  (a) an acrylic or methacrylic hydroxyester having 5 to 20 carbon atoms, and
  (b) a polyisocyanate having 5 to 44 carbon atoms and 2 to 4 isocyanate groups.

9. A coating composition according to claim 1, characterized in that the UV-curable binder is an unsaturated epoxy resin.

10. A process for coating a substrate, characterized in that the substrate is provided with a coating composition according to claim 1, and the composition is subjected to radiation having a wave length of 90–600 nm.

* * * * *